Figure 1:
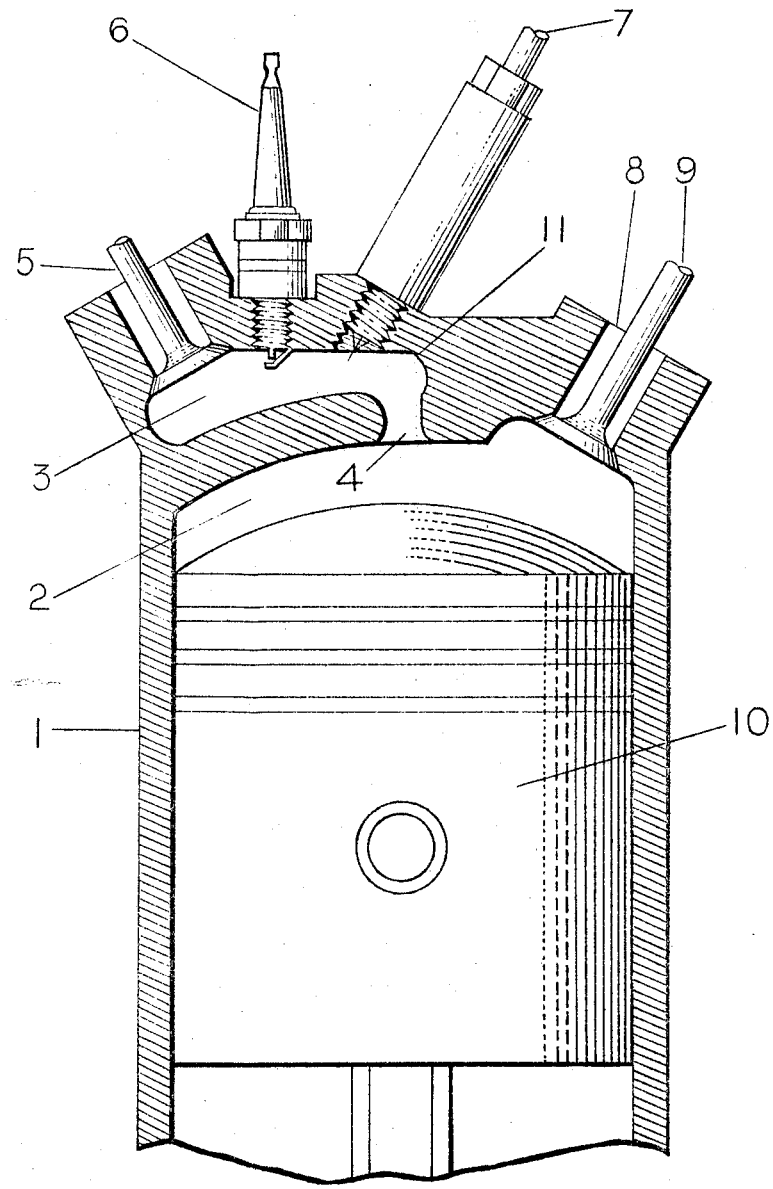

Sept. 6, 1966    J. S. BERNARD    3,270,722
METHOD OF CONDITIONING LIQUID FUELS
Filed April 22, 1964    3 Sheets-Sheet 1

INVENTOR.
John S. Bernard

United States Patent Office

3,270,722
Patented Sept. 6, 1966

1

3,270,722
METHOD OF CONDITIONING LIQUID FUELS
John Springer Bernard, 2060 East 4800 South St.,
Salt Lake City, Utah
Filed Apr. 22, 1964, Ser. No. 363,059
3 Claims. (Cl. 123—32)

This specification further clarifies the art of conditioning a charge of liquid fuel for combustion which was disclosed and claimed in my prior copending application, Serial Number 178,603, which was filed March 9, 1962.

This invention relates to internal combustion engines. More particularly it relates to internal combustion engines which are fueled by a fuel pump-injector apparatus and have ignition systems which can be manually or automatically regulated.

This invention deals with the atomizing of an injected liquid fuel charge by impact, friction and other forces. Its principal objective is to advance improvements in the art of preparing, or conditioning such injected fuel for rapid burning within a cylinder of an internal combustion engine.

The concept of conditioning an injected liquid fuel charge by employing impact and other forces to atomize, rather than to mix or to vaporize the fuel, was discussed in my prior patent, 2,986,134. The teachings in this prior patent show that the atomization of a liquid fuel charge can be accomplished by causing a series of steps to occur in a proper sequence within a fuel injector apparatus chamber or within a conditioning zone positioned outside of the main combustion chamber of an internal combustion engine. The critical steps of the prior conditioning process are (1) the timing of a fuel injection cycle to allow for its completion prior to creating an ignition, (2) retaining the injected fuel within the chamber or the conditioning zone during the engine's compression period and until after the ignition, (3) igniting a portion of the injected and retained fuel within the chamber or conditioning zone under conditions (the lack of sufficient oxygen) whereby a complete combustion cannot occur, and (4) causing the forces created by the ignition to react so as to atomize the residual fuel droplets remaining in the unburned portion of the fuel charge as they are passed from the chamber or conditioning zone and into the main combustion chamber of the engine.

The fuel conditioning concepts advanced in my prior patent relies upon a small, specifically designed chamber which serves as a conditioning zone in which to prepare the fuel so that the impact and other forces can be applied. A principal component of this chamber is a restricted type orifice which communicates the conditioning zone with the compression space in the main chamber of the engine. This restricted orifice is the only means provided for introducing free-oxygen bearing gases into the conditioning zone.

In practice it has been found that the lack of free-oxygen bearing gases in the conditioning zone adversely affects the ignition process. Certain internal combustion engines are not designed so as to clear all of the combustion gases from their main cylinders. These remaining combustion gases tend to fill the small confines of the conditioning zone and thus prevent the newly drawn in free-oxygen bearing gases from entering through the restricted orifice during the compression stroke of the engine.

This invention provides a specific improvement over the prior fuel conditioning concepts by providing a means for entering the free-oxygen bearing gas directly into the conditioning zone and by so doing, clearing the conditioning zone of all combustion gases left from the preceding charge. The new charge of air serves to cool the

2 conditioning zone, thus aiding in the prevention of a pre-ignition of the injected fuel and positively insures that a sufficient amount of free-oxygen bearing gas is present so that the vaporized fuel within the conditioning zone can be ignited therein.

The new art of conditioning fuel for combustion, as advanced in this invention employs impact and friction forces, together with the heat of previous and the present ignitions to atomize and thus prepare the injected fuel charge for rapid burning. In order to effect the atomization of the injected fuel by these forces a series of procedural steps must be caused to occur in a proper sequence within a fuel injector chamber or within a conditioning zone outside of the main chamber of an internal combustion engine. These steps and the sequence in which they must be caused to occur are (1) the introduction of a fresh charge of free-oxygen bearing gas directly into the chamber or the conditioning zone thereby clearing all combustion gases from said structure during the intake stroke of the engine, (2) injecting into the chamber or conditioning zone a liquid fuel in an amount stoichiometrically in excess of the free-oxygen bearing gas remaining in the chamber or conditioning zone, (3) timing the fuel injection cycle to allow for its completion during the compression period, (4) retaining the injected liquid fuel within the chamber or conditioning zone until the compression period has been completed, (5) thereafter igniting the injected and retained fuel within the chamber or conditioning zone under conditions (the lack of sufficient oxygen) whereby a complete combustion cannot occur, and (6) causing the forces created with the ignition of a portion of the injected fuel to react so as to atomize the residual fuel droplets remaining in the unburned portion of the fuel charge as they are ejected from the chamber or conditioning zone and into the main chamber of the internal combustion engine.

Another important object of this invention is to advance several novel and improved structures for use as multiple purpose fuel injector apparatus and/or internal combustion engine pre-chambers. These pre-chambers are primarily designed to perform the sequential steps of the conditioning procedure above described. However, by changing the timing and the sequence of events which occur within these chambers they may alternately serve as ignition, precombustion and/or conditioning chambers.

Normally, when the term "timing" is used in connection with the internal combustion engine, reference is being made to the routine timing of the spark from the ignition device with respect to the top dead center position of the engine's piston on the completion of its compression stroke. This timing variable is present in all internal combustion engines having ignition systems which can be regulated.

The timing variables which are adjusted to coordinate the ignition of the fuel charge with the beginning of the engine's power stroke in order to obtain optimum engine efficiency have no effect whatever on the fuel conditioning process used by the engine. There are two distinct timing cycles present in all internal combustion engine operations. First, the specific case of sequencing and timing the procedural steps to produce the fuel condition method in use (e.g. the timing of the opening of the intake valve with the cam action to start the carburetting process or the timing of the fuel injection cycle and/or the procedural steps herein outlined) and, second, the routine timing of the ignition device to coordinate the finale of the conditioning process with the beginning of the engine's power stroke.

A fact which is significant and of critical importance in this invention is that the fuel conditioning procedure cited above is not accomplished through routine or variable timing adjustments. The procedure is accomplished through premeditated and programmed steps which are sequenced and timed to produce specific end results. Moreover, any "routine" adjustment made in the sequence or to the timing of these procedural steps will produce an entirely different end result.

For example: If a glow plug, rather than an electrically timed spark plug, were to be used in a fuel injector apparatus chamber, the phenomenon which would occur within the chamber would not be the same as the phenomenon created when the sequential steps of the fuel conditioning procedure were followed. The sequence of steps could not be maintained with the glow plug because the fuel would be ignited immediately upon its entry into the chamber. It is obvious that the fuel could not be retained within the chamber after its ignition and any part of the fuel charge which was in the process of being injected after the ignition was started could not be acted upon by forces created at the time of ignition. However, the use of a glow plug and the ignition of the fuel within a pre-chamber at the beginning of the injection cycle is a common practice for conditioning a fuel charge for combustion. This old concept, of mixing and swirling an ignited fuel charge within a pre-chamber, was advanced when the structures known as the pre-combustion chambers and the ante-chambers were invented.

If the glow plug were utilized in any pre-chamber, the timing of the ignition could not be manipulated except by changing the beginning of the fuel injection cycle. This would only be done to "time" the engine. However, an electrically timed spark plug can be manipulated and adjusted to ignite the fuel immediately upon its entry into an apparatus chamber or to ignite the fuel after the completion of the injection cycle or at any point in time there between. Hence, by using a glow plug as the ignition device in a fuel injector apparatus chamber a particular phenomenon can be excluded from occurring therein. Conversely, the use of a time spark plug as the ignition device for a fuel injector apparatus chamber allows the phenomenon caused to occur within such chambers to be alternatively manipulated at the will of the mechanic or of the operator.

The foregoing recitations show that by manipulation of the procedural steps and/or by changing the ignition devices, a fuel injector apparatus chamber can be alternated between a "pre-chamber" for employing the procedure of mixing a burning fuel charge and thus preparing it for further combustion and a "conditioning zone" for preparing or conditioning fuel for combustion in accordance with the procedural steps above described.

The apparatus chambers presented for consideration in this case are so designed that the ignition devices employed therewith can be alternated, thus they can be utilized as multiple purpose chambers. Further, the design features of these chambers offer several novel improvements over prior structures of this class.

Figure 2:
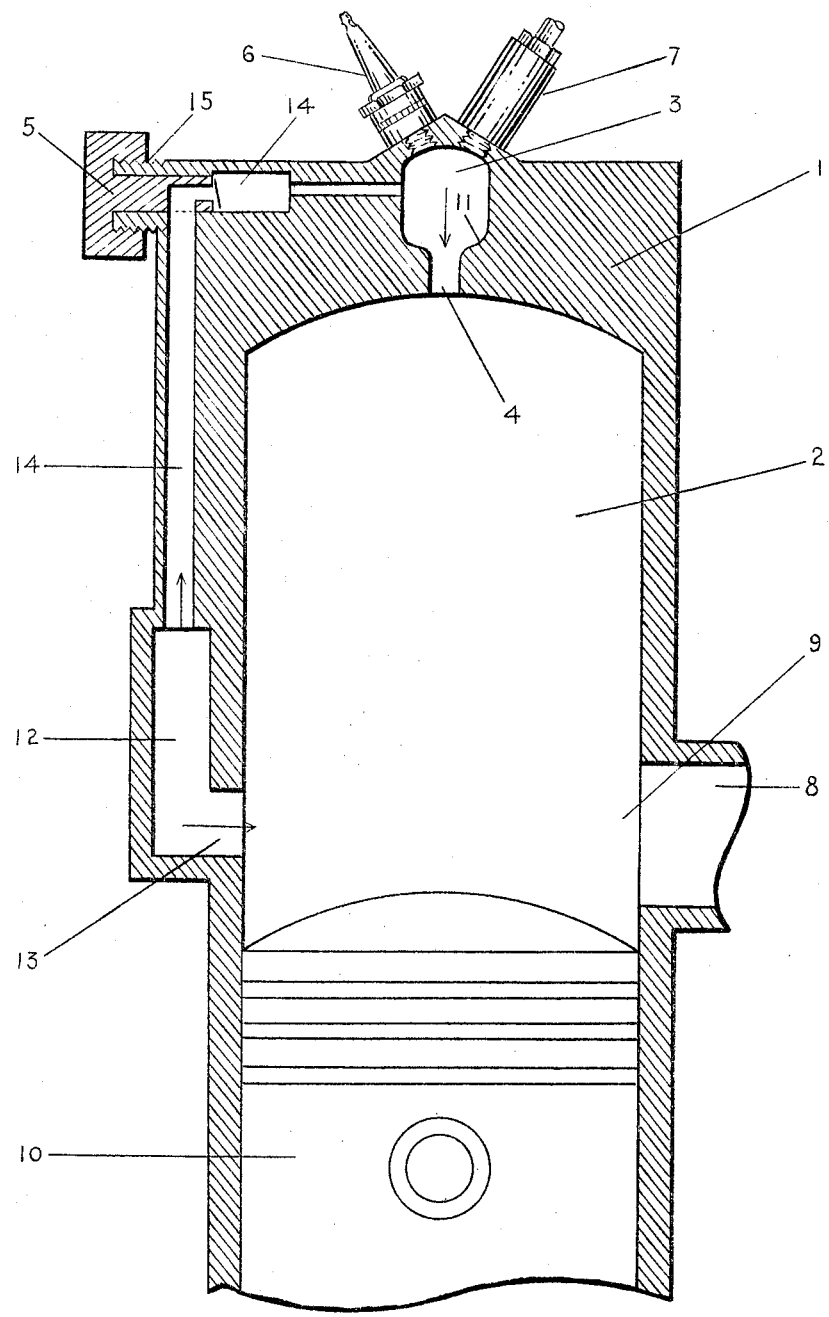
Figure 3:
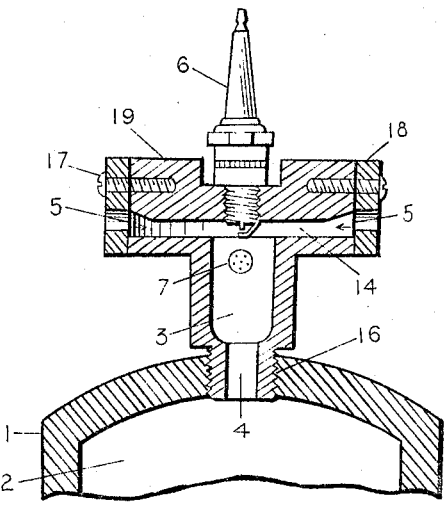
Figure 4:
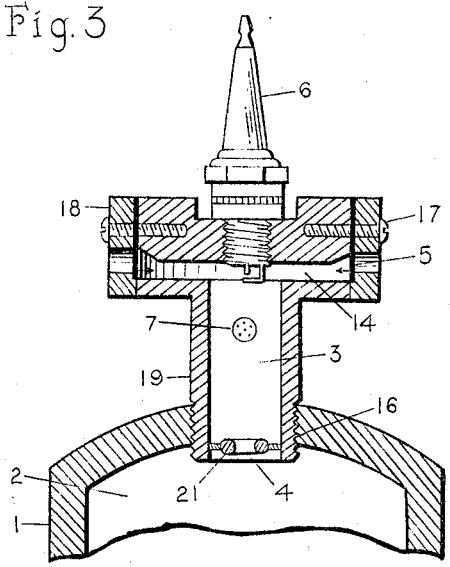
Figure 5:
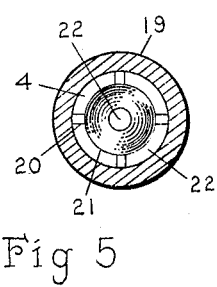

These improvements and the manner of accomplishing the objectives will be more readily understood by reference to the accompanying drawings which illustrate several structures in which this invention can be applied. FIGURE 1 illustrates a suitable structural arrangement for applying these concepts to a four stroke cycle internal combustion engine of a particular design, FIGURE 2 illustrates a suitable structural arrangement for applying these concepts to a two stroke cycle internal combustion engine of a particular design, FIGURES 3 and 4 illustrate detachable chambers of different designs which are suitable for adapting the procedural steps of the invention to any four stroke cycle internal combustion engine fueled by a fuel injector apparatus, and FIGURE 5 shows detailed structural features which can be applied in the communicating orifices of the auxiliary chambers depicted in all of the drawings and in particular the structure of FIGURE 4.

Referring to FIGURE 1 which shows the outer casing or cylinder block 1 of an engine formed so as to slideably encase a piston 10 within the main chamber 2. An auxiliary chamber 3, which is designed to serve this particular structure as a conditioning zone, is positioned outward from, and communicated with, the main chamber 2 through a restricted type orifice 4. The conditioning zone 3 is shown as being an extension of the engine's air intake duct in this configuration. It would not be recommended that this particular design be employed unless auxiliary compression means is to be provided for the engine. The assumption being that a supercharger apparatus (not illustrated) would be required to force sufficient air through this conditioning zone 3 to satisfy the the combustion needs of the engine.

During the normal operations of this engine arrangement, the crankshaft will cause the piston 10 to reciprocate within the main chamber 2. On the engine's intake stroke free-oxygen bearing gas will be entered around the intake valve 5, through the conditioning zone 3, through the restricted orifice 4 and into the main chamber 2. In this manner all the burned gases remaining from the preceding combustion will be swept from the conditioning zone 3 and the interior surfaces of the space will be somewhat cooled. After the completion of the intake stroke the remaining procedural steps of the process, as hereinabove described, are timed to begin.

The fuel injection cycle of the injector apparatus 7 is timed so as to begin and to be completed during the engine's compression stroke. All of the injected fuel is retained within the confines of the conditioning zone 3. During the period of fuel retention a small portion of the fuel molecules will be transformed from the liquid to the vapor state and the unvaporized portion of the charge will be in small droplets. The compression of gases by the piston in the main chamber 2 will force the fuel vapor backward into the conditioning zone 3 so that the vapor surrounds the spark ignition device 6. At the proper time (with respect to the position of the piston 10 at the completion of the compression stroke) an electric spark across the spark gap of the spark plug 6 will ignite the fuel vapor and the force of the ingnition will expel the residual fuel droplets of unvaporized fuel from the conditioning zone 3 with considerable force. The residual fuel droplets will be impinged against the end wall 11 of the conditioning zone 3 and/or cast laterally into the gas stream as such gas escapes from the small confines of the conditioning zone 3 through the restricted orifice 4. In this manner the injected raw fuel is reduced to small atomized particles which will burn rapidly when expelled into the main chamber 2 where sufficient free-oxygen gas is present to permit a complete combustion.

Important details concerning the design of the conditioning zone 3 are that its size must be limited so that there will be an insufficient amount of oxygen present within the space to permit a complete combustion of the injected fuel from occurring therein and that the restricted orifice be designed so that the required impact and friction forces will be created for breaking up the residual fuel droplets. A bottom, such as that depicted in FIGURE 5, may be employed for this purpose although such component need not be employed. Note particularly the structure as depicted in FIGURE 1. The end wall 11 is curved in a manner whereby a line drawn tangent from the point of intersection between said wall and the orifice 4 will extend laterally across the opening. Thus any residual fuel droplet forced into the wall 11 would course around the curved surfaces of said wall and be cast laterally across the orifice 4 and into the escaping gas stream. The sidewalls of the conditioning zone 3 opposite from the end wall 11 are likewise arranged so that residual fuel droplets will be cast laterally into the escaping gas stream and are thereby subjected to impact and friction forces as they pass through the orifice 4.

A suitable structural arrangement for adapting these fuel conditioning concepts to a two cycle internal combustion engine is illustrated in FIG. 2. This illustration shows the outer casing or cylinder block 1 of a two cycle internal combustion engine encasing a slidable piston member 10 within the main chamber 2 and a chamber 3 (which will adequately serve as a conditioning zone) outward from the main chamber.

A suitable air intake duct 12, here shown as a part of the block 1, must be provided. This duct 12 should be connected with a source of pressured air. Thus, when the engine's piston 10 is reciprocated downward, it will open an exhaust port 9 thereby releiving the combustion pressure which will allow the pressured air to enter the main chamber 2 as further downward movement of the piston 10 clears the intake port 13.

A duct means 14, which may be made from a piece of tubing or formed as a part of the block 1, is to be connected so as to communicate the air intake duct 12 with the conditioning zone 3. A suitable check valve means 5' must be mounted within this duct 14. A suitable mounting is illustrated. The threads 15 hold the valve 5' securely in place so that the intake air is controlled to flow toward the conditioning zone 3 and compression pressure from the main chamber 2 is prevented from escaping through the duct 14.

During the normal operations of this apparatus, the crankshaft will cause the piston 10 to reciprocate within the main chamber 2 and on the downward piston stroke the exhaust port 9 and then the intake port 13 will be cleared and opened. The combustion pressure within the main chamber 2 will be immediately relieved when the combustion gases are allowed to escape through the port 9 and to be carried away in the exhaust pipe 8.

When the pressure in the main chamber 2 drops below the pressure in the air intake duct 12, the pressured intake air will force open the valve 5' and a limited amount of air will course through the duct 14 and through the conditioning zone 3. In this manner a new supply of free-oxygen bearing gas will be provided within the conditioning zone for clearing the space of combustion gases left from the preceding combustion and for aiding in the next following ignition. The main body of free-oxygen bearing gas required for complete combustion of the injected fuel charge will be entered into the main chamber 2 as further downward movement of the piston 10 clears and thereby opens the intake port 13.

The upward, or compression, stroke of the piston 10 will close the ports 13 and 9 and the resulting pressure will act to close the valve 5', thereby sealing off the compression space of the main chamber 2. The remaining procedural steps of the fueling conditioning process will then be timed to begin.

Immediately prior to the ignition, the fuel injection cycle will have been completed, fuel vapor will have formed and have been pushed backward into the conditioning zone 3 so as to surround the spark plug 6 and unvaporized fuel, in the form of small fuel droplets, will be falling toward the main chamber 2.

The ignition is timed to occur at the proper time with respect to the completion of the engine's compression stroke at which time conditions as above described will exist within the conditioning zone 3. The ignition will drive the falling residual fuel droplets toward the orifice 4 with considerable force and will flow them around the curved surfaces of the end walls 11 and laterally into the escaping stream of burning gases. The atomizing of the fuel droplets in this instance is obtained by the forces of physical impact applied to the residual fuel droplets as they are impinged into the ejecting gas stream, the forces of friction as the escaping gases tears into these droplets and by the heat generated with the ignition.

The configuration of chambers which may be utilized as conditioning zones can be varied with considerable latitude. Designers may wish to change the shape of these chambers to adapt them to various models of internal combustion engines. Such variations are entirely satisfactory for applying these concepts when the design provides a means for entering air directly into the chamber, and the chamber has the capability of retaining or temporarily detaining the injected fuel, has a volume limit which will not permit a complete combustion to occur within its confines and has some means of flowing the residual fuel droplets resulting from the incomplete combustion into some obstruction or laterally into the escaping gas stream, preferably the communicating orifice between the conditioning zone and the engine's main chamber should provide for both an obstruction and for lateral cross flow.

Several chamber designs fall within the above parameters. An example of a suitable and materially different design is illustrated in FIGURE 3. This detachable structure may be used to adapt these fuel conditioning concepts to any four cycle internal combustion engine presently employed to power vehicles or equipment. This structure may be mounted onto an internal combustion engine by the illustrated threads 16 or by any other suitable means. The preferred design would provide threads 16 which would cooperate with the threads used to mount the spark ignition device presently provided in the cylinder head of the engine.

The interior design of the chamber of FIGURE 3 substantially conforms to the shape of the chamber shown in FIGURE 2. The basic difference between these two chambers is that the duct 14 of the present structure is communicated with the atmosphere rather than with the engine's intake air supply.

A valve means 5" is arranged in the duct 14 in a manner which permits it to open inward and prevents the escape of compression or combustion gases from the conditioning zone 3. Screws 17, adapted to seat in the structure's outer casing 19, hold a valve seat 18 and the spring of the valve 5" in position.

The fuel injector nozzle 7 should direct the fuel into the conditioning zone 3 at substantially right angles when positioned through a side wall of the chamber. It is necessary to direct the spray from the nozzle 7 away from the communicating orifice 4 so as not to forcibly inject any of the fuel charge out of the conditioning chamber 3.

In operation, the chamber design of FIGURE 3 provides a means for entering atmospheric air directly into the conditioning zone 3. The vacuum pressure created on the engine's intake stroke will bend the spring of the valve 5" inward and draw atmospheric air through the duct 14. This drawn-in air will be compressed on the engine's compression stroke and the force of the compression will act to seat the valve 5" against the valve seat 18 thereby entrapping the drawn-in air within the conditioning zone 3.

After the valve 5" has seated, the remaining procedural steps of the fuel conditioning process will be timed to begin. The conditions within the conditioning zone 3 at the completion of the compresson stroke and the atomizing action resulting from the ignition forces will be the same in the structure of FIGURE 3 as described for the conditioning zone of FIGURE 2.

Another example of a suitable and materially different chamber design which may be employed to practice the fuel conditioning concepts herein advanced is shown in FIGURE 4. The means described for the structure in FIGURE 3 may be provided for entering the atmospheric air directly into the conditioning zone 3, the volume limits of the structure can be controlled so that a complete combustion cannot occur within the conditioning zone 3 by limiting the diameter of the chamber, and the obstruction 21 will serve to break up the residual fuel droplets.

The fuel retaining or detaining capability of the structure of FIGURE 4 must be engineered according to speed ranges of the engine upon which the structure is to be installed. This will involve a study of the lapse times per each engine revolution and each compression period.

The fuel detaining capability can be engineered for lesser engine speeds by shortening the time of the fuel injection cycle and having it occur, for example, in the last quarter of the compression stroke and/or by lengthening the distance between the fuel injection nozzle 7 and the obstruction 21.

The obstruction shown in FIGURE 5 is comprised of a round ring 21 which may be held in an orifice 4 of a conditioning zone 3 by a series of brackets 20. This arrangement will serve to adequately break up the residual fuel droplets as they are forced from the conditioning zone 3 of FIGURE 4 by the forces created with the ignition.

The obstruction will cause the escaping air stream to bend, to compress and to be speeded up as the air molecules pass through the restricted openings 22 between the structural components of the arrangement. These actions will create considerable turbulence at the orifice 4. Moreover, approximately half of the residual fuel droplets will be driven into the members of the obstruction with sufficient force to break down the droplets and to splash the fine particles of fuel into the larger droplets that are coursing through the openings 22. This, together with the turbulence, the compression and the heat of combustion will create sufficient forces to effectively break down the residual fuel droplets to a size which will burn readily and rapidly in the main chamber of an engine.

The obstruction shown in FIG. 5 is but one of many such arrangements which would serve for breaking up and atomizing an injected fuel charge. Further, as hereinabove explained, the shape and the interior design of a conditioning chamber may be varied from the structures which I have illustrated and still accomplish the fuel conditioning process as set forth herein. It is to be understood that all rights to any such modifications which do not materially affect the principles and concepts as advanced are hereby reserved insofar as such modifications fall within the scope of the following claims:

I claim:

1. The method of conditioning and igniting fuel for combustion in a cylinder of an internal combustion engine, comprising the sequential steps of introducing free-oxygen bearing gas directly into a conditioning zone within said cylinder; passing a portion of said gas from said conditioning zone through a restricted orifice and into the combustion zone of said engine; increasing the pressure of said gas by compression while concomitantly spraying into said conditioning zone liquid fuel in an amount stoichiometrically in excess of the pressured free-oxygen bearing gas within said conditioning zone; completing said spraying action and detaining said sprayed fuel within said conditioning zone during the compression period, thereby allowing a portion of said sprayed fuel to transform from the liquid into the vapor state; igniting said fuel vapor within said conditioning zone after said spraying action, said ignition occurring in the presence of insufficient free-oxygen bearing gas to permit a complete combustion within said conditioning zone thereby leaving residual liquid fuel droplets therein; and flowing said residual liquid fuel droplets laterally into the gas stream ejected from said conditioning zone as said gases are forced through said restricted orifice by the increased pressure caused by the ignition.

2. A combination ignition and fuel supply chamber having a lesser volume than and adapted to be mounted in communication with the combustion space of a cylinder of an internal combustion engine, said chamber being elongated in shape and provided with sidewalls and end walls; a substantially flat portion located in one such end wall and curved wall portions connecting said sidewalls with said flat portion; a restricted orifice through said flat portion communicating said chamber with said combustion space; a duct means opening into said chamber in the extremity thereof opposite from said orifice, said duct containing a check valve means and communicating said chamber with a source of free-oxygen bearing gas; a fuel ignition means in said chamber; and a fuel injection means adapted to receive liquid fuel and inject same into said chamber in an amount stoichiometrically in excess of the free-oxygen bearing gas within said chamber, said injection means having spray nozzles and said nozzles oriented to spray fuel injected therethrough in a direction not directly aligned with said orifice.

3. A combination ignition and fuel supply chamber having a lesser volume than and adapted to be mounted in communication with the combustion space of a cylinder of an internal combustion engine, said chamber being elongated in shape and provided with sidewalls and an end wall; a round metal ring positioned in the extremity of said chamber opposite from said end wall and curved metal bracket means connecting said ring to said sidewalls thereby creating a substantially flat portion in said extremity; a series of restricted orifices through said flat portion communicating said chamber with said combustion space; a duct means opening into said chamber in the extremity thereof opposite from said flat portion, said duct containing a check valve means and communicating said chamber with a source of free-oxygen bearing gas; a fuel ignition means in said chamber, and a fuel injection means adapted to receive liquid fuel and inject same into said chamber in an amount stoichiometrically in excess of the free-oxygen bearing gas within said chamber, said injection means having spray nozzles and said nozzles oriented to spray fuel injected therethrough in a direction not directly aligned with said orifices.

References Cited by the Examiner
UNITED STATES PATENTS

| | | | |
|---|---|---|---|
| 2,615,437 | 10/1952 | Broderson | 123—32 |
| 2,743,711 | 5/1956 | Gross | 123—32.3 |
| 2,753,852 | 7/1956 | Beller | 123—32 |
| 2,986,134 | 5/1961 | Bernard | 123—32 |

MARK NEWMAN, *Primary Examiner.*

RICHARD B. WILKINSON, *Examiner.*